United States Patent [19]

McCay

[11] 3,917,942

[45] Nov. 4, 1975

[54] SUN TRACKING CONTROL APPARATUS
[75] Inventor: Thomas E. McCay, Norman, Okla.
[73] Assignee: Brown Manufacturing Company, Oklahoma City, Okla.
[22] Filed: Sept. 23, 1974
[21] Appl. No.: 508,054

[52] U.S. Cl. .............. 250/203; 126/270; 356/152
[51] Int. Cl.² ............................................. G01J 1/20
[58] Field of Search........ 250/203, 201, 210, 237 R; 126/270, 271; 356/152, 141; 244/1 SA, 3.16

[56] References Cited
UNITED STATES PATENTS
| | | | |
|---|---|---|---|
| 3,177,367 | 4/1965 | Brown................................ | 250/237 |
| 3,367,605 | 2/1968 | Wanger................................ | 244/1 |
| 3,613,659 | 10/1971 | Phillips................................ | 126/270 |

Primary Examiner—James W. Lawrence
Assistant Examiner—D. C. Nelms
Attorney, Agent, or Firm—Robert M. Hessin

[57] ABSTRACT

Electrical apparatus enabling control of sunlight collection or transmission which functions in response to sun position. The apparatus consists of quadrant sensitive sun sensors which function in coaction to produce definitive output pulses for input to logic circuitry. Outputs from the logic circuitry are applied through driver circuitry and shading control mechanism to track the sun's travel either clockwise or counterclockwise throughout daylight periods.

10 Claims, 9 Drawing Figures

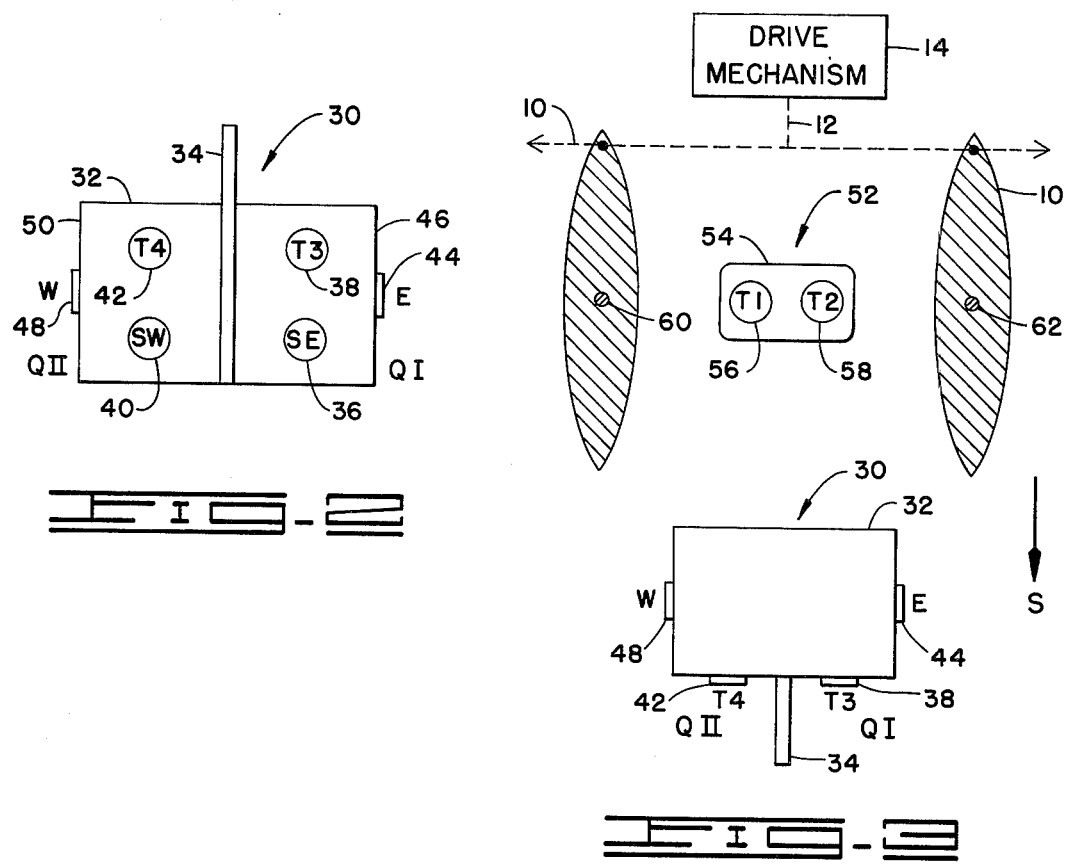
FIG-2
FIG-3
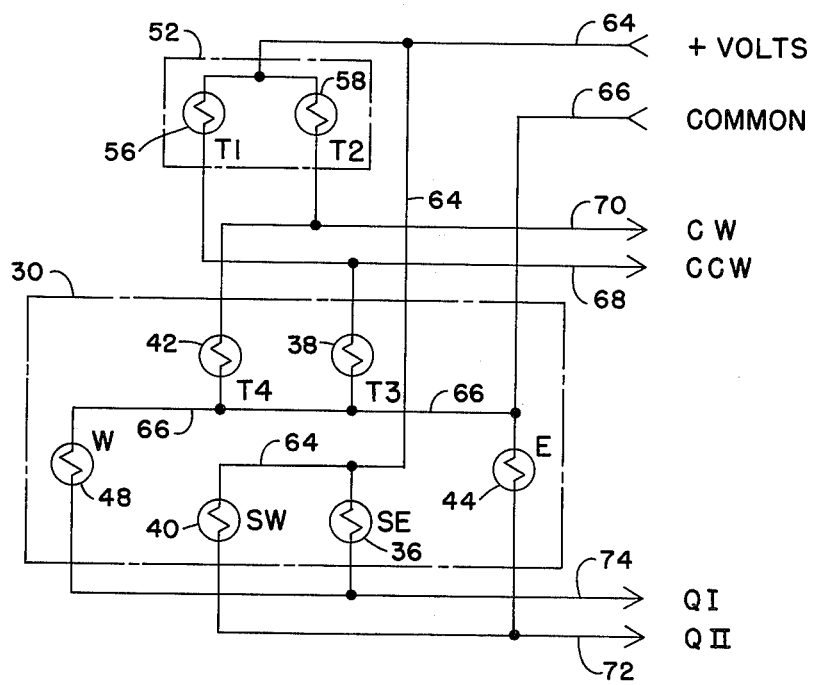
FIG-4

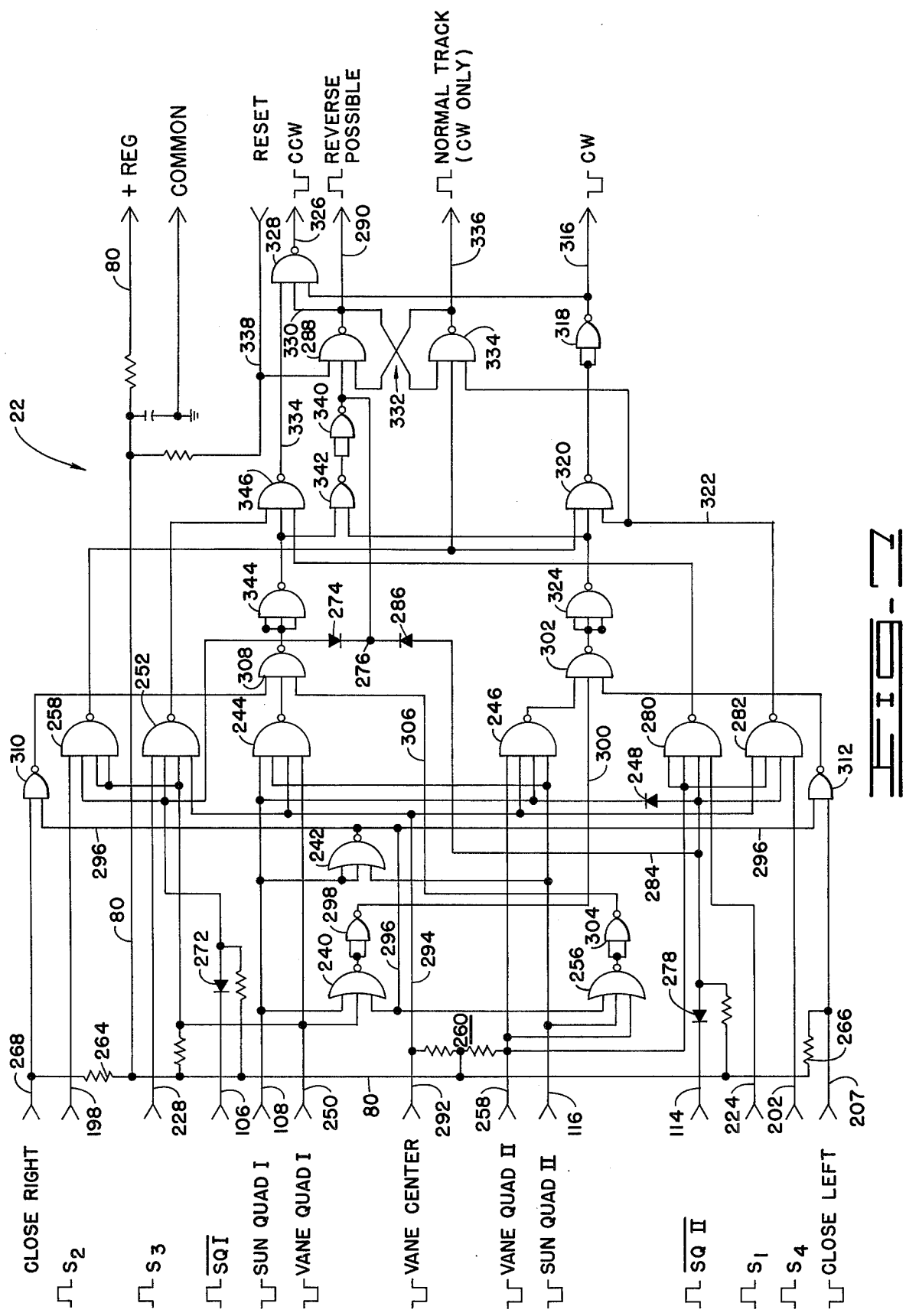

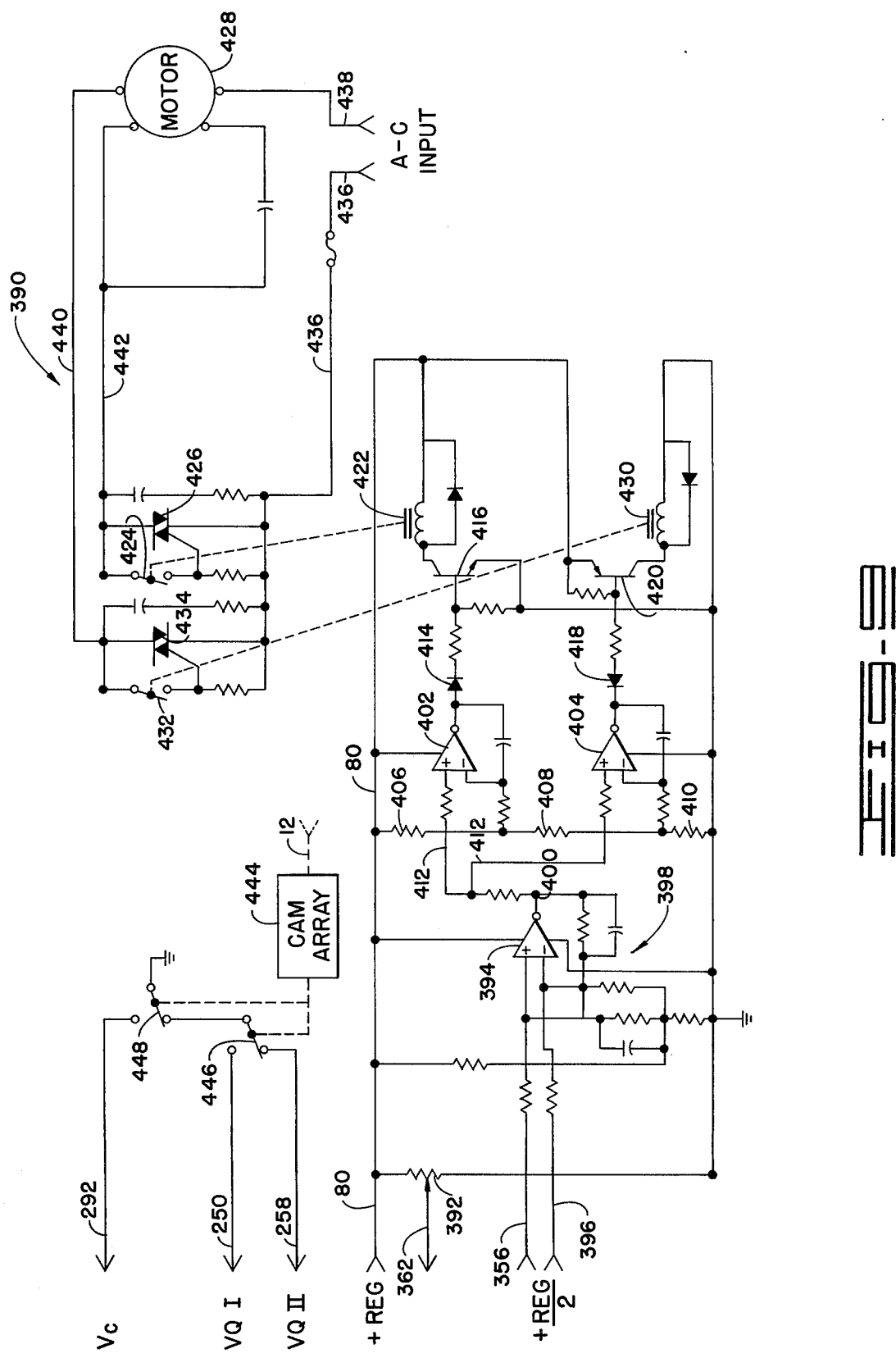

SUN TRACKING CONTROL APPARATUS

BACKGROUND OF THE INVENTION

1. Field of the Invention

The invention relates generally to a sunlight control system and, more particularly, but not by way of limitation, it relates to logical electrical system which tracks sun position throughout a daylight period to control entry of direct sunlight at a designated position.

2. Description of the Prior Art

The prior art includes several types of mechanical sun tracking systems as controlled and driven by electrical circuitry for the purpose and intent as above described. Primary in the field of prior art relating to such devices is the U.S. Pat. No. 3,177,367 in the name of L. G. Brown entitled "Solar Operated Louver Apparatus" as issued on Apr. 6, 1965. This patent provides teaching of synchronously driven louvers as employed over designated windows or other openings and controlled in response to photooptic sensing of the sun's position and associated electrical control circuitry.

SUMMARY OF THE INVENTION

The present invention contemplates a photoresponsive control system utilizing logic circuitry to continually maintain quadrant data indication for both a collector vane or shade vane position as well as sun position and to provide accurate tracking of vanes through morning, noon and afternoon sun positions to continually block direct sunlight from entry. The system utilizes a network of sun sensors adjacent the vane mechanism which provide direct logic output signals for input to a binary logic circuit functioning to control driver circuitry and vane control drive mechanism.

Therefore, it is an object of the present invention to provide more exact and more reliable sun shade control circuitry for use in controlling light entry through windows and the like.

It is yet another object of the present invention to provide a sun and vane position sensor assembly which generates a definitive output for direct input to logic circuitry.

It is still another object of the present invention to provide a control circuit for sun shading mechanism which is responsive to effects of partial cloudy days by avoiding spurious signal fluctuation and hunting by the vane mechanism.

Finally, it is an object of the invention to provide a new and improved sun control system for shading or heat collection in buildings and the like which is more economical and compact while rendering greater serviceability.

Other objects and advantages of the invention will be evident from the following detailed description when read in conjunction with the accompanying drawings which illustrate the invention.

BRIEF DESCRIPTION OF THE DRAWING

FIG. 2 is a front elevation of a sun sensor assembly as constructed in accordance with the present invention;

FIG. 3 is a top plan view of a sun sensor assembly and associated shade sensor assembly as constructed in accordance with the present invention;

FIG. 4 is a schematic diagram of the sun and shade sensor assemblies;

FIG. 7 is a schematic diagram of the logic circuitry of the present invention;

FIG. 8 is a schematic diagram of the driver circuitry of the invention; and

FIG. 9 is a schematic diagram of the main control circuitry of the present invention.

DETAILED DESCRIPTION OF THE INVENTION

Figure 1:
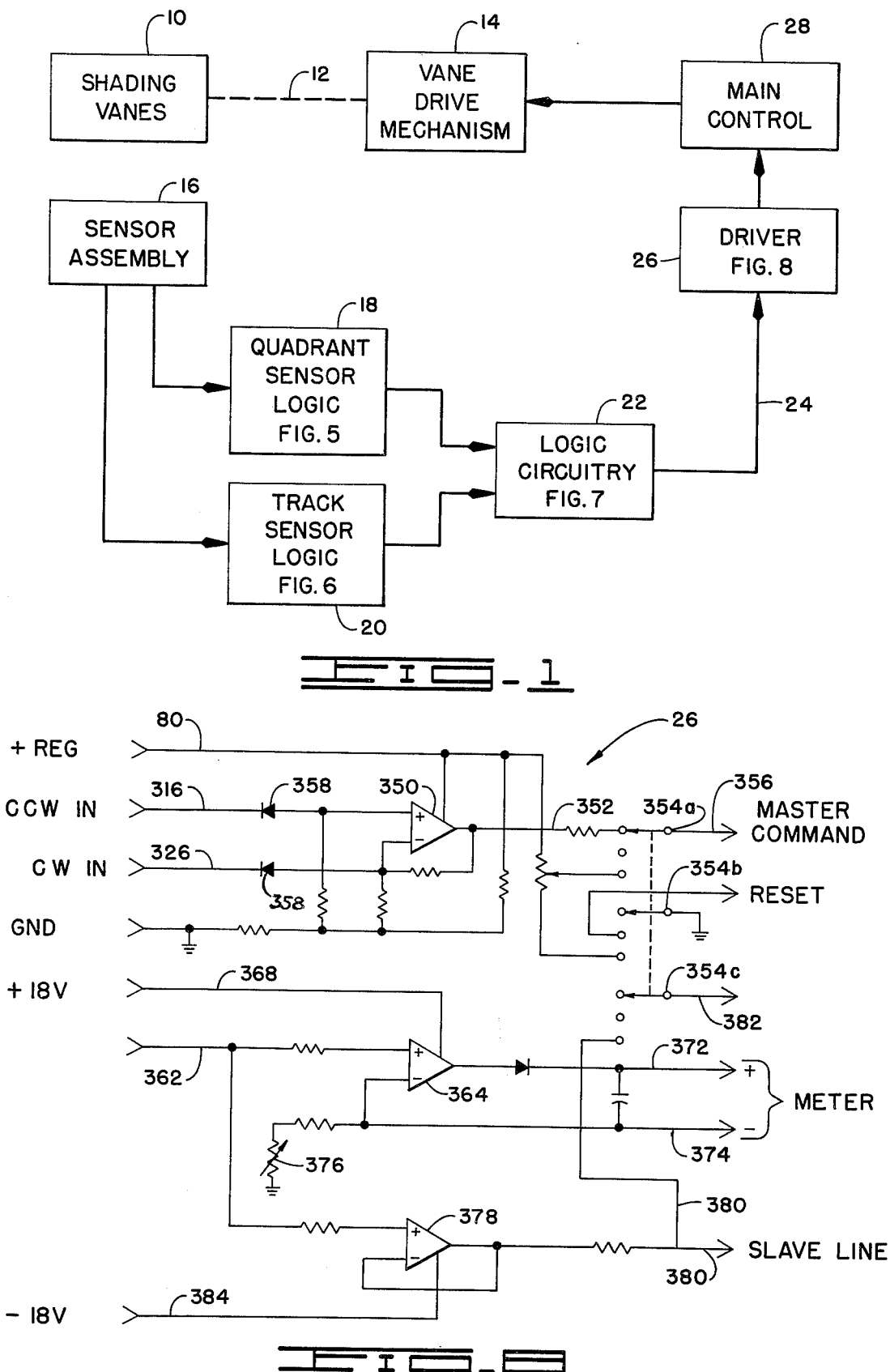
FIG. 1 is a generalized block diagram of the sun control system.

Referring to the generalized block diagram of FIG. 1, the objects of the invention are carried out by means of a plurality of vanes 10, either shade vanes or collectors, suitably driven by means of a mechanical linkage 12 from a vane drive mechanism 14. Such basic structure in and of itself is well-known in the prior art and is particularly exemplified by the U.S. Pat. No. 3,177,367 in the name of L. G. Brown, as aforedescribed. A plurality of vanes 10 as disposed over a selected light entry area are synchronously driven through open and closed positions to block or intersect entry of direct sunlight while allowing maximum ambient light therethrough. Control of vanes 10 and the associated vane drive mechanism 14 are carried out in response to sunlight sensing values derived in a sensor assembly 16 which includes both sun and shade sensor assemblies, to be further described. Output from sensor assembly 16 are then applied to each of a quadrant sensor logic circuit 18 and a track sensor logic circuit 20. Respective processed signal outputs from quadrant sensor logic 18 and track sensor 20 are then applied to a logic circuitry 22 whereupon drive output via line 24 is conducted to a driver circuit 26 for input to a main control circuit 28. The main control circuit 28 then effects motor control of the vane drive mechanism 14.

FIG. 2 illustrates a sun sensor assembly 30 which consists of housing 32 having a shadow plate 34 affixed centrally thereon. It will be understood, of course, that designations used herein relate to system use in the northern hemisphere. The south-facing panel of housing 32 includes four sun sensors, southeast sensor 36 and track sensor 38 on the easterly or quadrant I (QI) side, as well as a southwest sensor 40 and track sensor 42 on the westerly side of shadow plate 34. An east sensor 44 is disposed on side panel 46 of sensor assembly 30 and a west sensor 48 is affixed through side panel 50 of sensor assembly 30.

FIG. 3 illustrates the operational positioning of sun sensor assembly 30 in coactive positioning with a shade sensor assembly 52. Shade sensor assembly 52 is comprised of a housing 54 having a Track 1 solar sensor 56 and Track 2 sensor 58 each disposed through the top panel thereof. The shade housing 54 is suitably secured equidistant between a selected pair of vanes 10 and in line with the respective pivotal axes 60 and 62 of vanes 10. It should be understood that a large plurality of vanes 10 will be situated in-line or in any other coactive configuration under control of mechanical linkage 12 from drive mechanism 14, and that shade sensor assembly 52 is disposed along the pivotal axis while the sun sensor assembly 30 is disposed outward therefrom in total sunlight.

FIG. 4 illustrates in schematic diagram the interconnection of all Track and Quadrant sensors of sensor assemblies 30 and 52. The sensor elements or solar sensors in present design are cadmium sulfide photoresistive cells Type VT212L/2, commercially available from Vactec, St. Louis, Mo. Positive supply voltage is available on lead 64 with return via common lead 66 as interconnected throughout the sensor assemblies. The Track 1 sensor 56 is connected in series with Track 3 sensor 38 between supply lead 64 and common 66 and an intermediate output is taken via lead 68, the counterclockwise output. In like manner, Track 2 sensor 58 is connected in series with Track 4 sensor 42 with output taken via lead 70, representative of the clockwise output. Quadrant outputs are derived in like manner as positive supply voltage lead 64 is supplied through SOUTHWEST sensor 40 connected in series with EAST sensor 44 to common 66 and output for Quadrant II (QII) is present on lead 72, and SOUTHEAST sensor 36 and WEST sensor 48 are series-connected to provide Quadrant I or QI output on lead 74.

Figure 5:
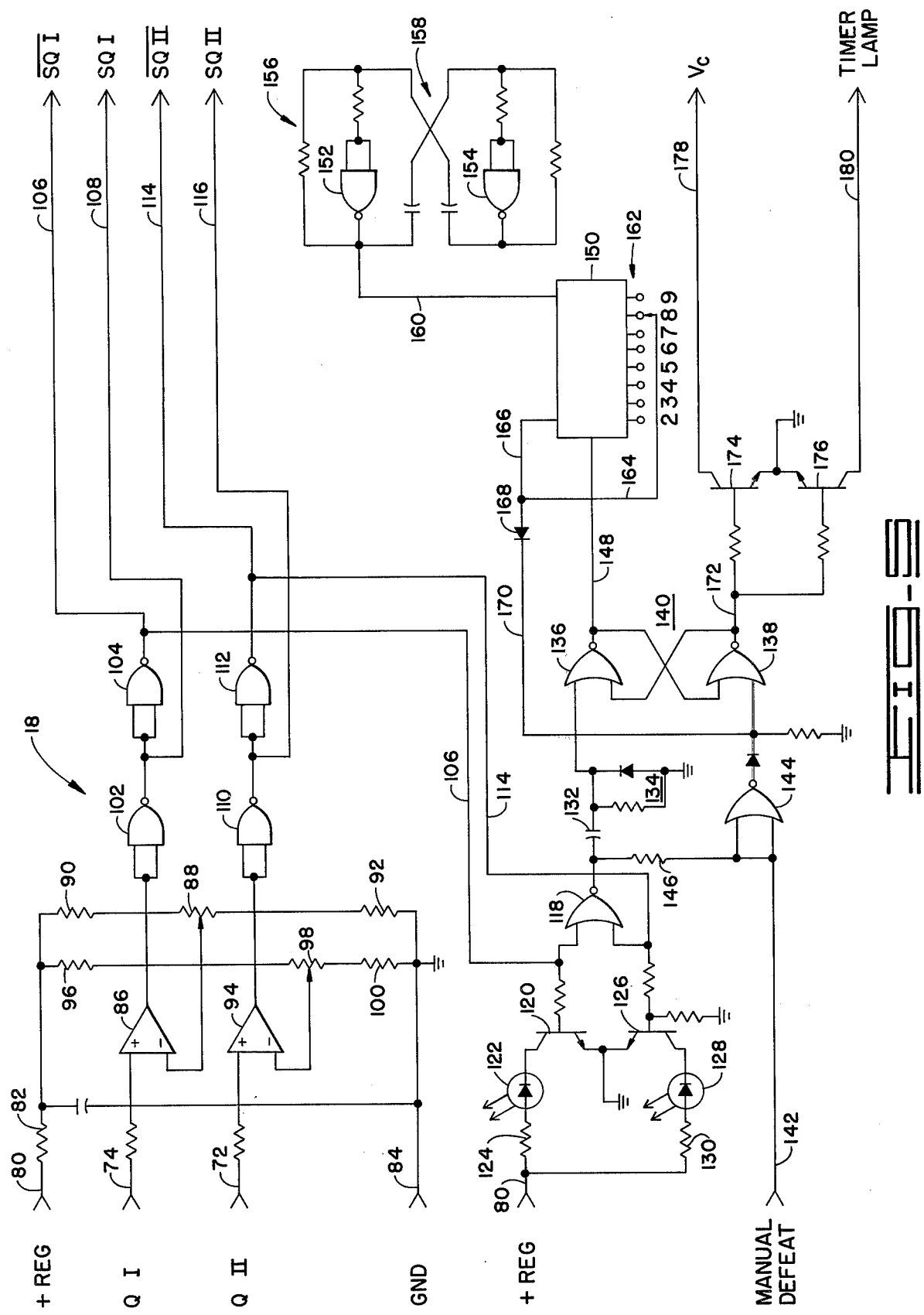
FIG. 5 is a schematic diagram of the quadrant sensor logic circuitry.

FIG. 5 illustrates the circuitry of quadrant sensor logic 18 (FIG. 1) in greater detail. Suitable positive regulated voltage from the power supply is applied by input 80 through dropping resistor 82 and ground connection is made via lead 84. QI input on lead 74, from the sun sensor 30 (FIG. 4), is supplied as input to an integrated circuit operational amplifier 86, a voltage comparator, which also receives input of reference voltage from potentiometer 88 of the voltage divider including resistors 90 and 92 across the supply voltage. The QII input on lead 72 is similarly applied through an integrated circuit operational amplifier 94, also a voltage comparator, which is similarly referenced from a voltage divider consisting of resistor 96, potentiometer 98 and resistor 100 connected across the supply voltage. Output from amplifier 86 is then applied through series-connected NAND gates 102 and 104 to enable opposite polarity outputs via leads 106 and 108, i.e. the SQI positive square pulse on lead 106 and the SQI negative square pulse on lead 108, respectively. Output from amplifier 94 is of similar configuration through series-connected NAND gates 110 and 112 to derive output of positive square pulse SQII output lead on 114 and the opposite SQII pulse output on lead 116.

The SQI and SQII outputs on leads 106 and 114 are also applied as inputs to a NOR gate 118 for timing circuit purposes. An NPN transistor 120 is connected common-emitter with the collector connected to an LED 122 and load resistor 124 to the positive voltage regulated supply 80. In like manner, lead 114 is also connected to an NPN transistor 126, LED 128 and load resistor 130. The LED 122 and 128 provide control panel indication as to equipment status.

The output from NOR gate 118 is applied through a coupling capacitor 132 and pulse shaping network 134 to one input of a NOR gate 136 acting in concert with latching NOR gate 138 as flip-flop stage 140. A "manual defeat" input 142 selectively applies a ground or low system voltage through a NOR gate 144 to reset the NOR gate 138 of flip-flop 140. The NOR gates 136 and 138 are connected for cross-coupled latching control, and output on lead 148 is applied as an enabling input to a decade counter 150, e.g. a decoded decade counter, Motorola type 4017. NAND gates 152 and 154 are connected in well-known manner with resistance-capacitance networks 156 and 158, respectively, to function as a free running multivibrator with output via lead 160 for trigger input to counter 150.

Adjustment of counter 150 is effected by selection of one of digit output leads 162 and selective connection of lead 164 from clock enable lead 166 which is also connected through a diode 168 and lead 170 for return to the input of NOR gate 138. The opposite output from flip-flop 140 or NOR gate 138 via lead 172 is applied in parallel to common emitter connected NPN transistors 174 and 176, and the respective collectors provide an automatic vane center control output on lead 178 and energization on lead 180 to provide timer lamp indication at a central control panel.

Figure 6:
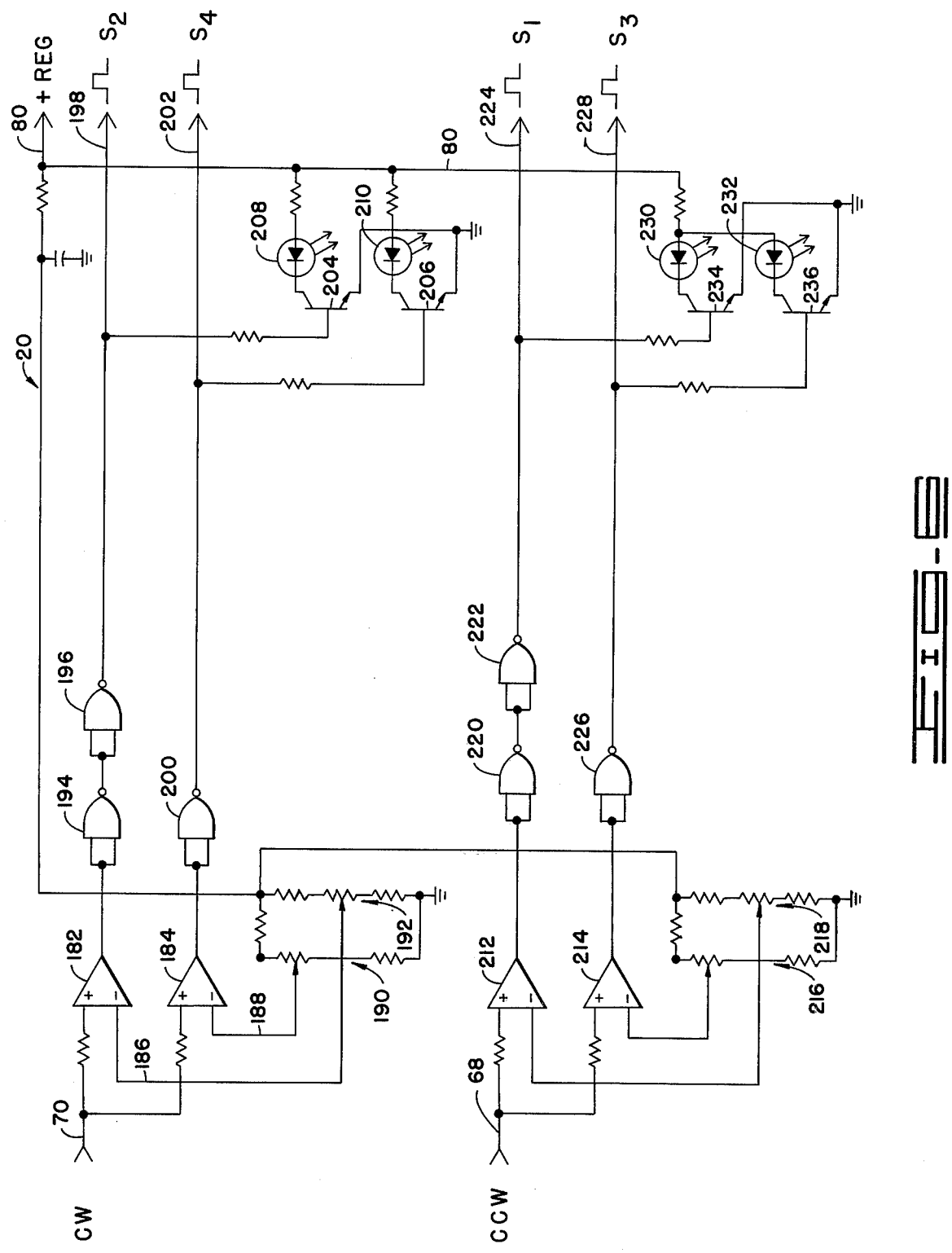
FIG. 6 is a schematic diagram of the track sensor logic.

FIG. 6 illustrates the track sensor logic circuitry 20 which receives clockwise (CW) signal input via lead 70 and counterclockwise (CCW) signal input on lead 68. CW signal input on lead 70 is applied in parallel to each of integrated circuit operational amplifiers 182 and 184, voltage comparators, having reference inputs 186 and 188 as controlled by respective potentiometer networks 190 and 192. The output from amplifier 182 is applied through inverter connected NAND gates 194 and 196 to generate S2 signal output on lead 198. The parallel output from amplifier 184 is applied through one stage of NAND gate 200 to provide S4 signal output on lead 202. Each of output leads 198 and 202 are also connected for input to NPN transistors 204 and 206, respectively, which are connected common emitter with collectors driving LED 208 and LED 210 to provide operational indication.

The CCW circuit from signal input 68 is connected in identical manner as input 68 is applied through operational amplifier voltage comparators 212 and 214 as referenced by respective potentiometer networks 216 and 218. Output from amplifier 212 is connected through series-connected NAND gates 220 and 222 to provide S1 signal output on lead 224, and output from operational amplifier 214 is connected through NAND 226 to develop S3 signal on output lead 228. Operational indication for the output circuits 224 and 228 is provided by the LED devices 230 and 232 as energized by respective NPN transistors 234 and 236.

FIG. 7 illustrates the logic circuitry 22 in greater detail. SQI signal on lead 108 is applied in parallel to NOR gate 240, NOR gate 242 and NAND gate 244 as well as a NAND gate 246 and it is blocked by diode 248. Vane Quadrant I or VQI input on a lead 250, as derived from cam switching in the power and control circuitry, to be described, is applied in parallel to NOR gate 240, NAND gate 244 and NAND gates 252 and 258.

SQII input on lead 116 is applied to a NOR gate 256, NOR gate 242, and NAND gates 246 and 244. The VQII input on a lead 258, as derived from power circuitry to be described, is applied directly to NAND gate 246 and NOR gate 256 as well as through a resistor biasing network 260 to positive supply lead 80. SQI signal on lead 106 is applied to the cathode of a diode 272 as well as in parallel to NAND gates 252 and 258 with further connection to the anode of a diode 274 and junction 276. SQII signal on lead 114 is connected through cathode of diode 278 for input to NAND gates 280 and 282 and the anode of diode 248, as well as via lead 284 to the anode of a diode 286 and junction 276. Junction 276 is also connected at the input to a NAND gate 288 which will provide output on a lead 290 as the "reverse possible" output indication.

S1 signal on lead 224 is applied directly for input to NAND gate 280 and, in like manner, S2 signal on lead 198 is applied to NAND gate 258. S3 signal on lead 228 is input to NAND 252 and the S4 signal on lead 202 is applied to NAND gate 282. A vane center input on lead 292, also derived from the power circuitry camming structure to be described, is applied via lead 194 for input to each of NAND gates 252, 244, 246 and 282.

The logic circuitry 22 of FIG. 7 functions on the NAND/NOR logic system such that a high or increased voltage output is seen at the output of the NAND gate whenever one or more of the inputs is at a low condition, and the NOR logic will provide a high voltage output only when all inputs are at the low voltage condition. Thus, NOR gate 240 receives SQI and VQI signal input as well as signal on lead 296 from the output of NOR gate 242, and output is through an inverter connected NAND gate 298 for further application of signal via lead 300 to NAND gate 302. NOR gate 256 serves to receive input of VQII and SQII signal input as well as the signal on lead 296 to provide output through an inverter connected stage 304 and lead 306 to input of a NAND gate 308. NOR gate 242 receives input of the SQI and SQII signal with output on lead 296 to each of NAND gates 310 and 312 which are further enabled by the close right and close left inputs on leads 268 and 270. Close right and close left signals are provided by switch indications activated by manual selection to provide a ground or low voltage indication.

A clockwise or CW command (negative pulse) at output lead 316 is derived through inverter connected NAND gate 318 when output from NAND gate 320 is high, and this condition occurs when less than all inputs to NAND gate 320 are high. A counterclockwise or CCW command pulse output (negative pulse) on lead 326 from NAND gate 328 can occur only with plural high inputs from NAND gate 318, lead 330 from flip-flop 332, and output from NAND gate 346. Flip-flop 332 is comprised of a latch connected pair of NAND gates 228 and 334, and alternative positive going outputs are the lead 290 which provides reverse possible signal output and a lead 336 which provides "normal track" output signal indication. Further input to NAND gate 288 is provided via reset lead 338, as may be actuated by a suitable switch at the manual control panel, and junction 276 at the output of NAND gate 340. Output from NAND gate 308 is applied in inverter connected NAND gate 344 for input to NAND gate 346 as well as NAND gate 342.

The CW and CCW command signals on leads 316 and 326, from logic circuitry 22 (FIG. 7), are input to an operational amplifier voltage comparator 350 in driver circuitry 26 of FIG. 8. Voltage comparator 350 is referenced to generate non-inverting vs. inverting signal outputs thereby to generate an output master command signal on lead 352 for connection to section 354a of auto-reset-manual switch 354, as shown in the auto position and providing master signal output via lead 356, Operational amplifier 350 is a standard integrated circuit amplifier utilized in well-known configuration and including input diodes 358 and 360 in respective input leads 316 and 326. It should be understood that all integrated circuit amplifiers or comparators utilized may be the commercially available Type 741.

An input lead 362 receives a master potentiometer reference input, from circuitry as will be described, for application in parallel to the non-inverting input of an integrated circuit operational amplifier (Type 741) operating as a linear amplifier 364. Output from amplifier 364 is taken across leads 372 and 374 for input to a vane position meter (not shown), and inverting input to amplifier 364 is adjustable as to voltage gain by potentiometer 376. Master reference input on lead 362 is also applied to the noninverting input of an integrated circuit operational amplifier 378 (Type 741) which is connected to operate as a linear amplifier follower having unity gain and to provide a slave voltage output via lead 380 to the manual contact of switch section 354c. A negative 18 volts supply voltage is applied via lead 384 to the linear amplifier 378.

Referring now to FIG. 9, the circuitry of FIG. 9 represents master control circuit 390 as utilized at the master control station; however, it should be understood that essentially the same circuitry will be utilized at each slave control point to effect slave control of various vane groups. A master potentiometer 392 provides output via lead 362 indicative of vane position and is applied as input in FIG. 8 to the linear amplifier 364 aforedescribed. The master command signal output on lead 356 (FIG. 8) is applied as input to the non-inverting input terminal of an integrated circuit operational amplifier 394 (Type 741) which is connected to function as a sense amplifier. The inverting input on lead 396 consists of one-half the positive regulated supply value. The bias circuitry of amplifier 394 regulates the output circuitry such that approximately 6 volts d-c is present at junction 400 when in the quiescent state. Input of a negative going CCW command voltage generates output at junction 400 of a negative signal with reference to 6 volts, and input of a positive going CW command signal will result in a more positive output signal from amplifier 394. Thereafter, the command signals are further processed in voltage comparators 402 and 404, each a standard configuration of integrated circuit operational amplifier (Type 741). Series resistors 406, 408 and 410 are connected as voltage dividers between regulated supply lead 80 and ground and serve to establish a differential voltage bias level as between the inverting inputs of amplifiers 402 and 404. Thus, if command output at junction 400 and output leads 412 is more positive than a selected mid-voltage, the voltage comparator 402 will amplify the signal and provide a positive going output through a diode 414 for input to the base of an NPN transistor 416. If the signal on leads 412 is less than the pre-set reference, the voltage comparator or amplifier 404 will generate a negative going output which is conducted through the cathode input to diode 418 for application to the base of a PNP transistor 420.

The NPN transistor 416 conducts upon application of the positive going voltage to energize relay 422 thereby closing relay contacts 424 to trigger a Triac 426 and energize electrical motor 428 in well-known manner. The PNP transistor 420 is oppositely connected with the emitter tied to the plus regulated voltage lead 80 such that negative going output from voltage comparator 404 causes conduction and energization of relay coil 430 to close relay contacts 432 and trigger a Triac 434.

A-c input for energization of motor 428 is via leads 436 and 438 from any suitable source. The motor 428 in present designs is a capacitor start, reversible a-c motor of selected horsepower according to size and requirements of the drive assembly. Selective energization of the Triacs 434 or 426 will connect respective leads 440 or 442 to a-c input lead 436 and cause opposite direction energization of motor 428.

The motor 428 is, of course, an integral portion of vane drive mechanism 14 (FIG. 1) and serves to drive the sun shading vanes via linkage 12 in parallel synchronism in accordance with sun position and/or light conditions. The mechanical linkage 12 connecting output rotation from motor 428 to the shading vanes 10 (FIG. 1) is also applied through a cam array 444 for the purpose of actuating a vane quadrant switch 446 and a vane center switch 448. A suitable cam, in cam array 444, drives two-position switch 446 so that a ground output is present on one of leads 250 or 258, depending upon whether or not the shading vanes 10 are in quadrant I or quadrant II. It may be noted that the ground outputs are dependent upon the vane center cam switch 448 which is also controlled by a suitable cam to be actuated and provide ground output on lead 292 only when the shading vanes 10 are exactly at 90° to the vane plane. Thus, the $V_c$, VQI and VQII signals on respective leads 292, 250 and 258 are then applied as input to the respective inputs in logic circuitry 22 of FIG. 7, as aforedescribed. The cam array 444 receiving input from drive linkage 12 is also adapted to include additional cams for switch actuation to control other more general operational features such as travel limits, analog shaft position encoders, remote vane position indication, etc.

In operation, all Figures will be referred to as noted. As generally employed, the system of the present invention will be utilized to control positioning of solar collection or shade vanes 10 at light access openings in buildings and the like, and in the case of large office buildings, there may be many banks or tiers of individually driven groups of vanes 10. The present operation is directed to control of shade vanes. In this case, a single one of the vane groups may be controlled and designated as the master station from which slave cable connection to each of the remaining groups in parallel will enable synchronous positioning control by simple servo techniques well-known in the art. The sun sensor assembly 30 and track sensor assembly 52 are positioned at the vanes 10 as shown in FIG. 3 such that the sensor assemblies become quadrant sensitive. That is, relative to a line perpendicular to the line through the rotational axes 60 and 62, which perpendicular direction is designated as local noon, Quadrant I is designated as the easterly quarter or CCW from shadow plate 34, and Quadrant II is designated as westerly or the CW direction relative to shadow plate 34.

With reference to FIGS. 2, 3 and 4, it can be seen that when the sun is in the QI sector illumination will fall on SE sensor 36, T3 sensor 38, T1 sensor 56 and E sensor 44. Illumination of the sensors reduces the resistance of that sensor to provide output voltage variation. During the morning hours, SE sensor 36 will be subject to a high illumination compared to W sensor 48 but after the local noon condition the SE sensor 36 will abruptly lose a large amount of light due to shading by the shadow plate 34 while W sensor 48 will be receiving as much or more light than SE sensor 36. Due to their series interconnection between positive voltage lead 64 and common 66, all voltage values on lead 74 above a threshold voltage of about one-half the supply voltage, are indicative of sun presence in quadrant I and all voltage values below the threshold are indicative of sun absence in quadrant I. The signal for sun presence in quadrant II is generated using series-connected SW sensor 40 and E sensor 44 in precisely the same manner. Processing of the output signals on leads 72 and 74 by the voltage comparator circuits 86 and 94 (FIG. 5) function to transform the smoothly varying output signals QI and QII into a step function or On-Off format which is suitable for input to the logic circuitry (FIG. 7).

It may be noted that the T1 sensor 56 and T2 sensor 58 are located between two adjacent shading vanes 10 in such a fashion as to allow the right hand vane to achieve shading of T2 sensor 58 from the morning sun by an appropriate amount of CW rotation. The T3 sensor 38 and T4 sensor 42 are located outside of the shading influence of the vanes and are under influence of shadow plate 34.

Thus, noting the series-connected T2 sensor 58 and T4 sensor 42, it will be seen that T4 sensor 42 will be shaded by the shadow plate 34 until shortly before local noon while T2 sensor 58 will be shaded by the right hand shading vane 10 only a relatively short time. During this time, the average illumination on both will be approximately the same and the resultant CW signal will be a voltage value in the vicinity of one-half the voltage supply. Designating a voltage slightly in excess of one-half of the supply voltage as the threshold, all values above the threshold are indicative of a need for CW vane rotation and all values below the threshold voltage will indicate no further need for CW vane rotation, and this applies whenever the sun is present in Quadrant I.

In the case of afternoon sun, T2 sensor 58 and T4 sensor 42 will again have equal average illumination and therefore produce a CW signal of one-half the supply voltage; however, the operational difference lies in the fact that for afternoon sequences the balanced condition is that of equal direct illumination as opposed to the morning balance condition of equal shading. As the sun moves westward, the left hand shading vane 10 eventually shadows T2 sensor 58 with resulting CW signal considerably below one-half the supply voltage. Then, utilizing a threshold voltage slightly less than one-half supply voltage, all values below the threshold are indicative of need for CW vane rotation and all values above the threshold indicate no need for CW vane rotation, this situation applying for sun presence in Quadrant II. The output tracking signals on leads 68 and 70 are then processed through voltage comparator circuits 182, 184, 212 and 214 (FIG. 6) and transformed into an On-Off step function format suitable for input to the logic circuitry of FIG. 7.

The QI and QII inputs to FIG. 5 are applied through voltage comparators 86 and 94 whereupon both polarities of output are provided as SQI, $\overline{SQI}$, SQII and $\overline{SQII}$ output signals on respective leads 106, 108, 114 and 116. The timing circuitry of FIG. 5 provides a function of delaying full open actuation during cloudy days thereby to prevent vane actuation during periods when small clouds pass through the sun line. The amount or length of time delay may be set by selection of feedback lead 164 of decade counter 150 as programmed. That is, one of count outputs 162, each representing a specific amount of delay, may be selected to arrive at a desired multiple or overall time delay. Control of counter 150 may be an operating panel adjustment effected at the central meter and control panel.

CW and CCW signal on leads 70 and 68 (FIG. 6) are applied in parallel to respective pairs of voltage comparators 182 and 184, and 212 and 214 to derive the respective tracking signals S1 through S4 as output on leads 198, 202, 224 and 228 for input to the logic circuitry 22 of FIG. 7. Yet additional input signals are input to logic circuitry 22, such as VQI on lead 250, VC on lead 292, and VQII on lead 258 as derived from the cam switching assembly in control circuitry 390 (FIG. 9) also, a close right or close left signal is applied via one of leads 268 or 270 depending upon which direction one desires that the system have automatic close capability.

The basic rules upon which logic circuitry 22 functions are that the vanes 10 not be permitted to be directed in a quadrant in which the sun is present. Further, with respect to logic circuitry 22, all true commands are low signal. Logic circuitry 22 provides for a tracking mode wherein the vanes are following the sun, as well as a non-tracking mode of automatic nature to effect full open at night time or full closed at noontime.

When the sun is in Quadrant I, S2 input on lead 198 actuates NAND gate 258 which, in turn, actuates NAND gates 320 and 334 to provide CW control output on lead 316. In like manner, when the sun is in Quadrant II, S4 signal input on lead 202 activates NAND gate 282 via lead 322 to activate NAND gates 320 and 318 to provide CW command output on lead 316; and simultaneously, the energization on lead 322 activates NAND gate 334 to provide a normal track signal output on lead 336 indicative of latching of flip-flop 332 so that a CCW command cannot be output.

When the sun is in Quadrant I, CCW tracking is effected by activation of NAND gate 252 by S3 input on lead 228 to energize NAND gates 346 and 328 to provide CCW command output on lead 326. With the sun in Quadrant II, CCW tracking is effected by input of S1 signal on lead 224 to activate NAND gate 280 and NAND gates 346 and 328 with resultant CCW command output on lead 326. NOR gate 240 serves as a Quadrant opposition stage and receives input of SQI and VQI signal at respective leads 108 and 250. NOR gate 240 functions together with NOR gate 256 which receives SQII and VQII signal input via respective leads 116 and 258. Activation of NOR gate 240 is applied to NAND gates 302 and 324 to enable a non-tracking command and disabling of CW and CCW output NAND gates 318 and 328, respectively.

A noon output is generated in NOR gate 242 with input of SQI signal simultaneous with input of SQII signal on respective leads 108 and 116, indicating full illumination of the sensor assemblies. Noontime vane activation is then effected by a selected one of NAND gates 310 or 312, whichever one is receiving the programmed "close right" or "close left" signal low via respective leads 268 or 270. Outputs from the selected one of NAND gates 310 or 312 then follow through the logic as aforesaid to provide the respective CCW command or CW command output on leads 326 and 316, respectively.

NAND gates 244 and 246 function to command the full open position of vanes. That is, the full open position of the vanes 10 will place a low on lead 292 indicating that vanes 10 are at center. Anytime the signal at junction 276 is low, all tracking outputs are disabled to enable only the non-tracking functions.

The CCW and CW command outputs from logic circuitry 22 on leads 326 and 316 are then applied as input to driver circuitry 26 (FIG. 8) whereupon the voltage comparator 350 provides polarity sensitive output signal via lead 356, the master command output for input to the motor control circuitry and driving of the vanes 10 in response thereto. Voltage comparator 350 receives negative going CCW command voltage at positive input thereto to provide a non-inverting negative-going output command via lead 356, Conversely, a negative CW input on lead 326 to voltage comparator 350 will provide an inverting output or positive-going pulse on lead 256 to effect CW rotational master command.

Master command output on lead 256 is then input to the amplifier circuitry of FIG. 9 to effect alternative energization of NPN transistor 416 or PNP transistor 420 and energization of the respective Triacs 426 or 434 to effect reversible energization of the drive motor 428. Drive motor 428 is, of course, connected via a suitable mechanical linkage 12 to effect following rotation of the shading vanes 10 to shade the protected opening. Any number of slave vane stations in the building or other structure is controlled in response to a slave line output lead 380 (FIG. 8) using well-known servo control techniques so that slave vanes 10 follow through movement identical to those effected in master vanes 10.

The foregoing discloses a novel sun vane system wherein the sun's rays are detected and vanes are driven in optimum manner without danger of hunting, partial shade effects, reflection effects and other anomalous problesms often associated with the similar types of equipment. The sunlight tracking system as constructed in accordance with the present invention has proven to be extremely reliable while being economical of construction and requiring little or no maintenance over long periods of time. It should be understood that while the present description is directed to a sun vane shading system, the similar circuitry is equally applicable for control of solar collector panels utilized for both energy generation or sunlight energy/shading combination effects.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. Sun responsive control apparatus including a plurality of vanes for interception of sunlight across a selected plane, which vanes are synchronously driven in response to control circuitry, comprising:

sun sensor means disposed between two of said vanes and generating a track signal output indicating need for vane movement;

quadrant sensor means disposed in sunlight and having plural sunlight sensors located about a shade plate directed perpendicular to said plane and generating sun quadrant signal output;

logic circuit means receiving both said track signal and quadrant signal output to generate a command output; and control means receiving said command output to drive said vanes for the duration of said command output.

2. Apparatus as set forth in claim 1 which is further characterized in that:

said sun sensor means includes first and second track sensors disposed in juxtaposition parallel to said plane and between said selected two shading vanes.

3. Apparatus as set forth in claim 1 which is further characterized in that:

said quadrant sensor means includes a first and second plurality of sensors each disposed on opposite sides of said shade plate.

4. Apparatus as set forth in claim 2 which is further characterized in that:

said quadrant sensor means includes a first and second plurality of sensors each disposed on opposite sides of said shade plate.

5. Apparatus as set forth in claim 1 wherein said logic circuit means comprises:
   quadrant sensor logic receiving as input said sun quadrant signal output to provide plural sun quadrant signals indicative of sun presence in said first and second quadrants;
   track sensor logic receiving as input said track signal output to provide plural tracking signals indicative of requirement for one of clockwise and counterclockwise tracking movement by said vanes; and
   logic circuitry receiving as input all of said sun quadrant signals and tracking signals to generate one of a clockwise and counterclockwise command output to said control means.

6. Apparatus as set forth in claim 5 wherein said control means further comprises:
   voltage comparator amplifier means receiving each of said clockwise and counterclockwise command outputs to generate an opposite polarity voltage; and
   polarity responsive amplifier means receiving said voltage to energize reversible electrical drive motor means to drive said vanes in one of clockwise and counterclockwise direction.

7. Apparatus as set forth in claim 1 wherein said sun sensor means further comprises:
   a supply voltage source;
   a track 1 sensor disposed in said sun sensor means connected to said supply voltage and in series connection with a track 3 sensor disposed in said quadrant sensor means and generating an output counterclockwise track signal at said connection; and
   a track 2 sensor disposed in said sun sensor means connected to said supply voltage and in series connection with a track 4 sensor disposed in said quadrant sensor means and generating an output clockwise track signal at said connection.

8. Apparatus as set forth in claim 1 wherein said quadrant sensor further comprises:
   a source of supply voltage;
   a first sensor disposed on a first side of said shade plate connected to said supply voltage and in series connection with a second sensor disposed on the second side of said shade plate and generating an output sun quadrant one signal at the connection; and
   a third sensor disposed on the second side of said shade plate connected to said supply voltage and in series connection with a fourth sensor disposed on the first side of said shade plate and generating an output sun quadrant two signal at the connection.

9. Apparatus as set forth in claim 7 wherein said quadrant sensor means further comprises:
   a source of supply voltage;
   a first sensor disposed on a first side of said shade plate connected to said supply voltage and in series connection with a second sensor disposed on the second side of said shade plate and generating an output sun quadrant one signal at the connection; and
   a third sensor disposed on the second side of said shade plate connected to said supply voltage and in series connection with a fourth sensor disposed on the first side of said shade plate and generating an output sun quadrant two signal at the connection.

10. Apparatus as set forth in claim 9 wherein said logic circuit means comprises:
    quadrant sensor logic receiving as input said sun quadrant one and sun quadrant two signals to provide plural sun quadrant signals indicative of sun presence in said first and second quadrants;
    track sensor logic receiving as input said counterclockwise and clockwise track signals to provide plural tracking signals indicative of requirement for one of clockwise and counterclockwise tracking movement by said vanes; and
    logic circuitry receiving as input all of said sun quadrant one and sun quadrant two signals and counterclockwise and clockwise track signals to generate one of a clockwise and counterclockwise command outputs to said control means.

* * * * *